United States Patent [19]
Katsuoka et al.

[11] Patent Number: 5,486,497
[45] Date of Patent: Jan. 23, 1996

[54] CERAMIC FIBER YARN, AND A METHOD OF AND A SPINNING MACHINE FOR MAKING THE SAME

[75] Inventors: Kyuji Katsuoka; Noriho Harumiya; Tadahiro Hashizume; Tadashi Kitahara, all of Nagano, Japan

[73] Assignee: Taimei Kagaku Kogyo Kabushiki Kaisha, Nagano, Japan

[21] Appl. No.: 191,933

[22] Filed: Feb. 4, 1994

[30] Foreign Application Priority Data

Feb. 8, 1993 [JP] Japan ................................. 5-019958

[51] Int. Cl.⁶ ............................ D02G 3/06; C04B 35/10
[52] U.S. Cl. ........................... 501/95; 501/128; 501/154; 428/364; 428/401
[58] Field of Search ........................... 501/95, 128, 157, 501/154; 57/248, 249; 428/401, 364

[56] References Cited

U.S. PATENT DOCUMENTS 4,047,965   9/1977   Karst et al. ........................... 501/128
4,523,427   6/1985   Carr ........................................ 57/248

*Primary Examiner*—C. Melissa Bonner
*Attorney, Agent, or Firm*—Birch, Steward, Kolasch & Birch

[57] ABSTRACT

The present invention relates to a ceramic fiber yarn, which has higher weaving and knitting performance. The ceramic fiber yarn comprises a group of filaments, the filaments being made by the steps of spinning mother liquid, which comprises colloidal silica and basic aluminum chloride, and firing, the filaments comprising 67–75 wt % of alumina and 25–33 wt % of silica and mainly having polycrystalline transition alumina, and is characterized in that: the loop strength of each the filament, which is measured by a wire having diameter of 0.5 mm, is at or greater than $2.5 \times 10^{-2}$ N (N: Newton); and the crystal structure of the filament substantially changes to polycrystalline mullite after heating for 30 minutes at the temperature of 1,400° C.

5 Claims, 7 Drawing Sheets

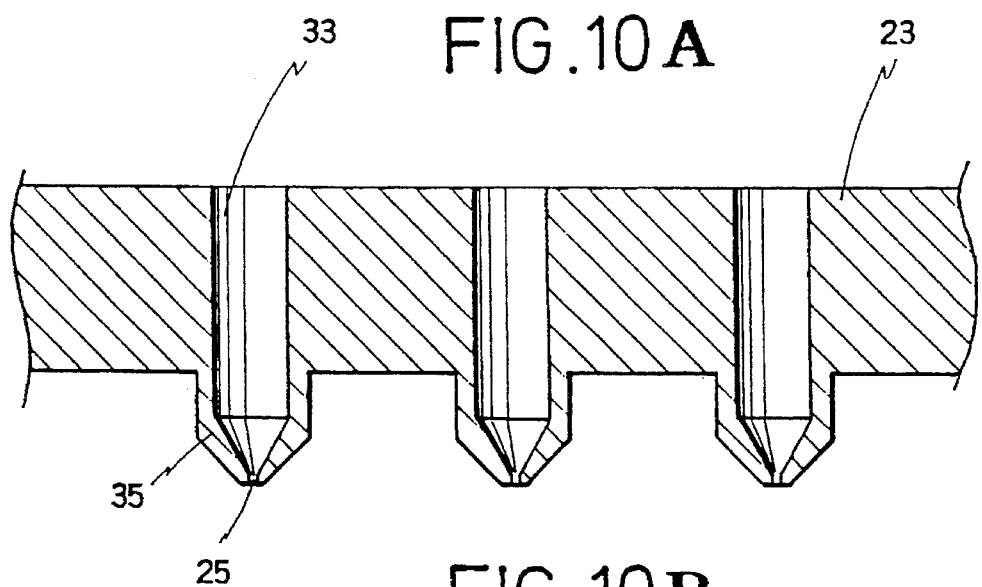
FIG. 10 A
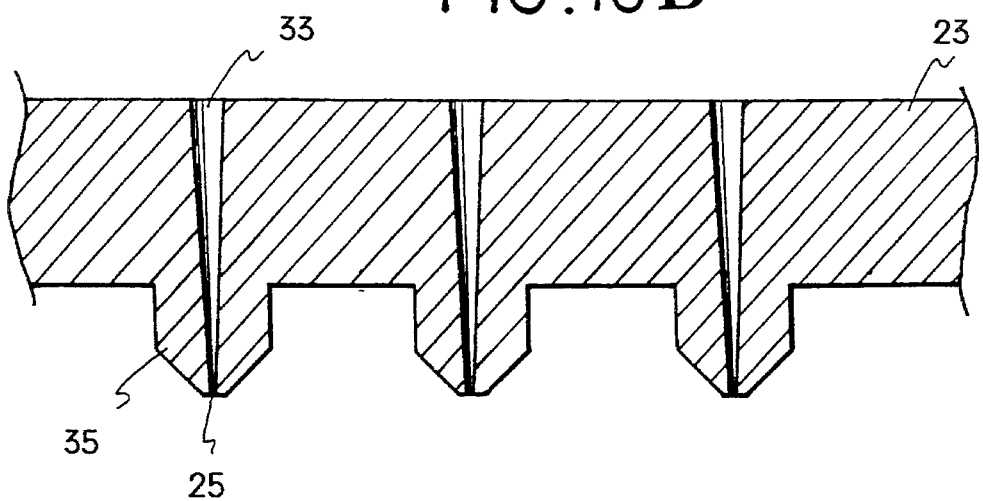
FIG. 10 B
FIG. 11 A
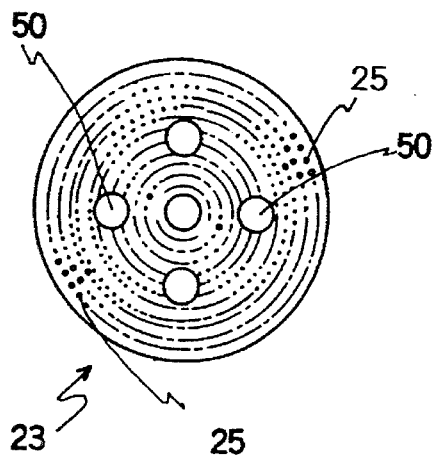
FIG. 11 B
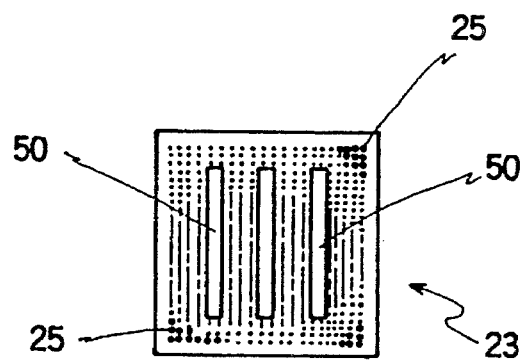

CERAMIC FIBER YARN, AND A METHOD OF AND A SPINNING MACHINE FOR MAKING THE SAME

BACKGROUND OF THE INVENTION

The present invention relates to a ceramic fiber yarn, and a method of and a spinning machine for making the same, more precisely relates to a ceramic fiber yarn, whose crystal structure of filaments substantially changes to polycrystalline mullite after heating at high temperature, and a method of and a spinning machine for making the same.

Since ceramic fiber yarns, e.g., alumina, have a superior heat-resisting property, they are widely used for anti-heat products. For example, conventional ceramic yarns disclosed in the U.S. Pat. No. 4,047,965 have a crystal structure of polycrystalline transition alumina, so the crystal structure of their filaments changes to polycrystalline mullite when they are heated at high temperature. Therefore, at high temperature, the ceramic yarns have higher flexibility than ceramic yarns which has α-alumina crystals after heating at high temperature. By having the higher flexibility at high temperature, cloth made of the ceramic yarns disclosed in said US patent are used for a lining of furnaces, etc..

Since the conventional yarns are made from mother liquid, which substantially includes no chlorides, the yarns include substantially no chlorine. If yarns are made from mother liquid including chrolide, such as basic aluminum chloride, the weaving and knitting performance is lowered, and fluff is apt to be formed.

On the other hand, the mother liquid including chlorides has higher extensibility, so that the productivity of the yarns can be raised. If the mother liquid, which includes water-dispersible alumina sols or water-soluble organic aluminum salts instead of basic aluminum chloride, is used, the extensiblity and productivity of yarns will be lower than that of yarns which are made from mother liquid including basic aluminum chloride.

SUMMARY OF THE INVENTION

An object of the present invention is to provide a ceramic fiber yarn, which is made from mother liquid including basic aluminum chloride for higher extensibility, and which comprises filaments mainly having polycrystalline transition alumina. The weaving and knitting performance of the ceramic fiber yarn is higher, and the crystal structure of said filaments substantially changes to polycrystalline mullite after heating at high temperature.

Another object thereof is to provide a method of making the ceramic fiber yarn of the present invention.

Other object thereof is to provide a spinning machine for making the ceramic fiber yarn of the present invention.

The inventors of the present invention have studied to achieve the objects, and they reached the fact that the loop strength of each filament of the yarn, which is measured by a wire having diameter of 0.5 mm, mostly affects the properties thereof, e.g., weaving performance. Namely, the yarn whose loop strength is greater than prescribed value has higher weaving and knitting performance.

Namely, the ceramic fiber yarn of the present invention comprising a group of filaments, the filaments being made by the steps of spinning mother liquid, which comprises colloidal silica and basic aluminum chloride, and firing, the filaments comprising 67–75 wt % of alumina and 25–33 wt % of silica and mainly having polycrystalline transition alumina, characterized in that:

the loop strength of each the filament, which is measured by a wire having diameter of 0.5 mm, is at or greater than $2.5 \times 10^{-2}$ N ( N: Newton ); and the crystal structure of the filament substantially changes to polycrystalline mullite after heating for 30 minutes at the temperature of 1,400° C.

In the ceramic fiber yarn of the present invention, yarn cutting during weaving or knitting can be reduced by making the knot strength thereof at or greater than 200 dyn/TEX.

If at least a part of the filaments have flat shapes in the transverse sections and twisted sections, which are serially formed with separations in the axial direction, the loop strength of the filaments and the knot strength of the yarn can be higher.

If the mixture rate of the flat filaments is at or greater than 10% of all filaments, the yarn has not only higher knot strength but also higher flexibility.

If the ratio of a first width, which is maximum width of the flat section of the filament to a second width, which is maximum width thereof in the direction perpendicular to the direction of the first width, is 1.1–3.0, the yarn has not only higher flexibility but also higher strength.

Furthermore, if the separations between the twisted sections are 10–500 µm, the strength of the yarn can be higher and higher.

Next, the method of making the ceramic fiber yarn, whose Filament crystal structure is mainly polycrystalline transition alumina, comprises the steps of:

extruding filaments, which are made from mother liquid comprising colloidal silica and basic aluminum chloride, into a spinning chimney through a spinneret;

making contact the filaments with a hot dry fluid, whose dew point is at or lower than 4° C.;

drawing the filaments rapidly dried; and firing the filaments.

In the method, if the hot dry fluid flows as a counter-current with respect to the filaments drawn, the filaments can be fully contacted the hot dry fluid.

If the spinneret has a first group of extruding holes and a second group of extruding holes, and there is formed a gap, through which at least a part of the hot dry fluid is introduced out from the spinning chimney, between the groups, each filament can be fully contacted the hot dry fluid, and a multiple extruding holes can be formed in the spinneret without enlarging spinning chimney. And there may be a first spinneret having a plurality of extruding holes and a second spinneret having a plurality of extruding holes. In this case, the gap, through which the hot dry fluid is introduced out from the spinning chimney, may be formed between the two spinnerets.

Note that, if hot dry air is used as the hot dry fluid, the filaments extruded can be rapidly dried.

Furthermore, the spinning machine of the present invention, which is capable of making a ceramic fiber yarn by extruding filaments, which are made from mother liquid comprising an inorganic compound such as basic aluminum chloride and a solvent such as water, into a spinning chimney through a spinneret; and making contact the filaments with a hot dry fluid so as to rapidly dry the filaments, characterized in that:

the spinneret has a first group of extruding holes and a second group of extruding holes, and there is formed a gap, through which at least a part of the hot dry fluid is introduced out from the spinning chimney, between the groups.

And there may be a first spinneret having a plurality of extruding holes and a second spinneret having a plurality of extruding holes instead of the single spinneret, and there may be formed a gap, through which the hot dry fluid is introduced out from the spinning chimney, between the spinnerets. By having the gap, the filaments can be dried easily and rapidly.

In the present invention, the yarn whose crystal structure changes to polycrystalline mullite after heating at high temperature is made by spinning the mother liquid including basic aluminum chloride for higher extensibility, so that productivity of the yarn can be raised.

Since the filaments of the yarn have higher loop strength than that of the filaments of the conventional yarns, the weaving and knitting performance can be raised, and forming fluff can be prevented during weaving and knitting steps.

In the method and the spinning machine of the present invention, the yarn with higher weaving and knitting performance and no fluff during weaving and knitting steps can be industrially made.

BRIEF DESCRIPTION OF THE DRAWINGS

Embodiments of the present invention will now be described by way of examples and with reference to the accompanying drawings, in which:

FIG. 10A is a sectional view of extruding holes bored in a spinneret;

FIG. 10B is a sectional view of extruding holes bored in a spinneret;

FIG. 11A is a sectional view of a spinneret of another example; and

FIG. 11B is a sectional view of the spinneret thereof.

DETAILED DESCRIPTION OF PREFERRED EMBODIMENTS

Figure 1A:
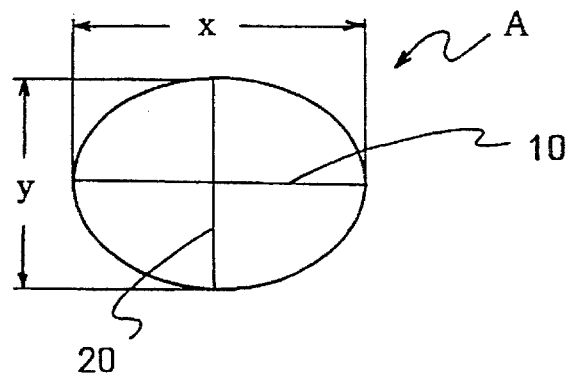
FIG. 1A is a transverse sectional view of a flat filament of a yarn of an embodiment of the present invention.

In the present embodiment, mother liquid includes colloidal silica and basic aluminum chloride.

Acid aqueous dispersion of colloidal silica is preferably used as the colloidal silica; basic aluminum chloride $[Al_2(OH)_nCl_{6-n}$: $0<n<6]$ with basicity at or greater than 70% can be preferably used. Note that, the basicity is defined as $(n/6) \times 100$.

It is important that a ceramic fiber yarn, which is made by spinning the mother liquid and firing, should have 67–75 wt % of alumina and 25–33 wt % of silica, and crystal structure of filaments forming the yarn mainly should be polycrystalline transition alumina.

If the rate of alumina is greater than 75 wt % and that of silica is less than 25 wt % in the yarn, the crystal structure of the filaments of the yarn is mainly polycrystalline transition alumina. Thus, α-alumina crystal having large crystal size will be formed by heating at temperature of at or higher than 1,400° C., so that the yarn will be fragile. On the other hand, if the rate of alumina is less than 67 wt % and that of silica is greater than 33 wt % in the yarn, cristobalite is formed while heating at temperature of at or higher than 1,400° C., so that the yarn will be fragile.

In the present embodiment, the yarn fired is heated for 30 minutes at the temperature of 1,400° C. In this case, it is important that the crystal structure of the filaments forming the yarn, which have fired, substantially changes from the polycrystalline transition alumina to polycrystalline mullite. By the heating under this condition, the strength and the flexibility of the yarn having the polycrystalline mullite become slightly lower but they are practically enough.

On the other hand, in the yarn having the polycrystalline transition alumina and substantially no polycrystalline mullite, which is heated under said condition, the polycrystalline transition alumina left changes to the α-alumina and the strength and the flexibility of the yarn suddenly become lower if the heating at the temperature of 1,400° C. is further continued.

By the heating for 30 minutes at the temperature of 1,400° C., the crystal structure of the yarn becomes substantially polycrystalline mullite. The strength and the flexibility of the yarn are more gradually lowered than yarns which have the polycrystalline transition alumina left even if the heating at 1,400° C. is further continued. Thus, the strength and the flexibility of the yarn can be maintained for a long time while heating.

In the present embodiment, the loop strength of each filament of the yarn, which is measured by a wire having diameter of 0.5 mm, should be at or greater than $2.5 \times 10^{-2}$ N (N: Newton), preferably at or greater than $3.0 \times 10^{-2}$ N, more preferably at or greater than $3.5 \times 10^{-2}$ N. With said loop strength, forming fluff can be prevented as much as possible while the yarns are woven.

To prevent yarn cutting as much as possible while weaving or knitting, the knot strength of the yarn should be at or greater than 200 dyn/TEX. The knot strength is preferably at or greater than 230 dyn/TEX, and more preferably at or greater than 280 dyn/TEX.

Figure 4:
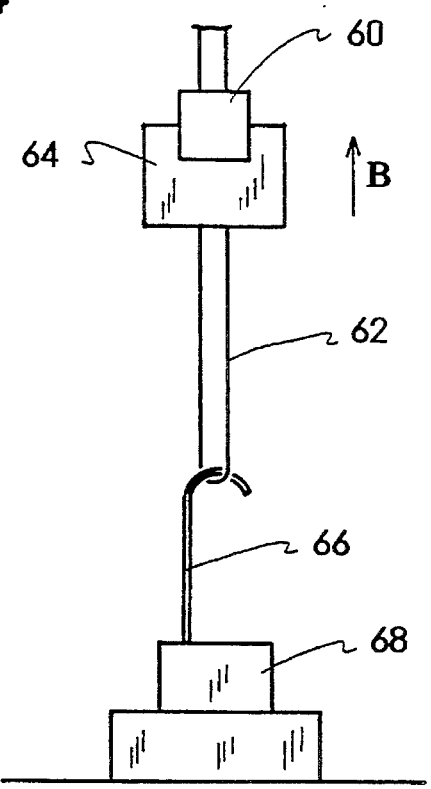
FIG. 4 is an explanation view showing how to measure the loop strength of the filament.

The loop strength is measured by a manner, for example, shown in FIG. 4. In FIG. 4, a wire 66, which is made of stainless steel and has a circular shape in section, is provided on a base 68. There is formed a hook at a front end of the wire 66. The looped filament 62 whose both ends are gripped by a gripper 64 is hooked by the hook of the wire 66. Then a clamper 60 of the gripper 64 is pulled in the direction of an arrow B to measure the strength of the filament 62.

The loop strength of the filament which is measured by the manner shown in FIG. 4 depends on the wire diameter. The loop strength of some kinds of filaments, which are measured by said manner of FIG. 4 with the wires having different diameter, is shown in FIG. 6 as graph.

Fluff formed while weaving and Knitting is mainly formed by a weaving and knitting machine. The tension in the looped filaments concentrates to turning points thereof, so that the filaments are cut and the fluff is formed. Therefore, forming the fluff depends on the curvature of the looped filament and the tension therein.

Figure 6:
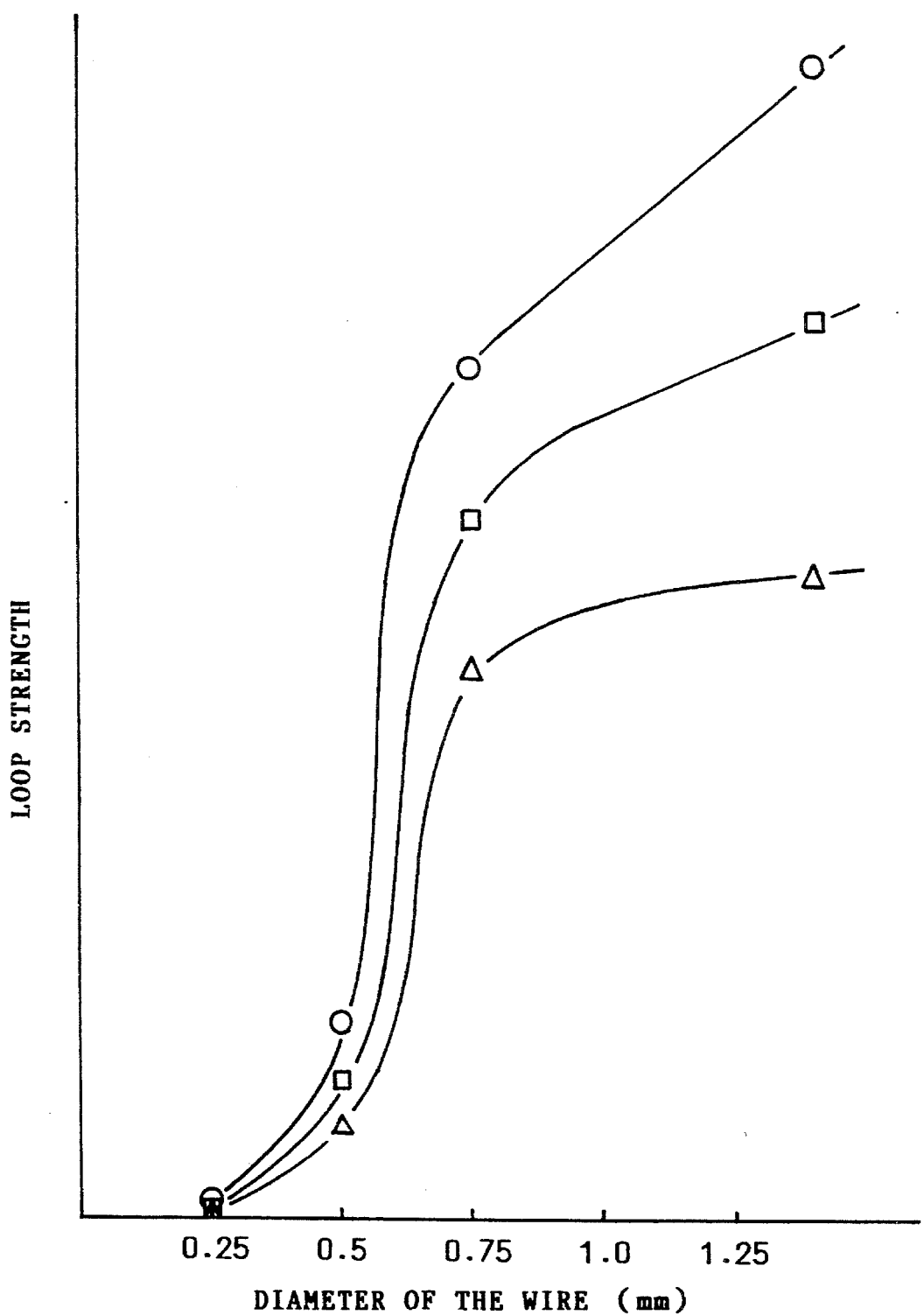
FIG. 6 is a graph showing relation ships between the loop strength of the filament and diameter of a wire for measuring the loop strength.

As shown in FIG. 6, when the wire diameter is more than 0.75 mm, the wire diameter has a slight influence on the loop strength, so that the loop filament has small curvature and the cutting of the filament is more affected by the tension in the filament than the curvature thereof. On the other hand, when the wire diameter is less than 0.5 mm, the wire diameter has a great influence on the loop strength, so that the loop filament has greater curvature and the cutting of the filament is more affected by the curvature of the filament than the tension therein.

When wires having the diameter of 0.5 mm–0.75 mm are used the curvature of the filaments becomes proper and the cutting of the filaments is equally affected by the tension in the filaments and the curvature thereof. In this case, the forming fluff has a preferable correlatively to the loop strength of the filaments.

However, the loop strength measured by the wires having the diameter of 0.5 mm–0.75 mm is greatly affected by the wire diameter as shown in FIG. 6. Thus, the loop strength measured by the wires having the diameter of 0.5 mm–0.75 mm is apt to have a great error.

Therefore, in the present embodiment, the wire having the diameter of 0.5 mm is used for measuring the loop strength of the filament because said wire has a relatively small error in measurement and preferable said correlativity.

Figure 5:
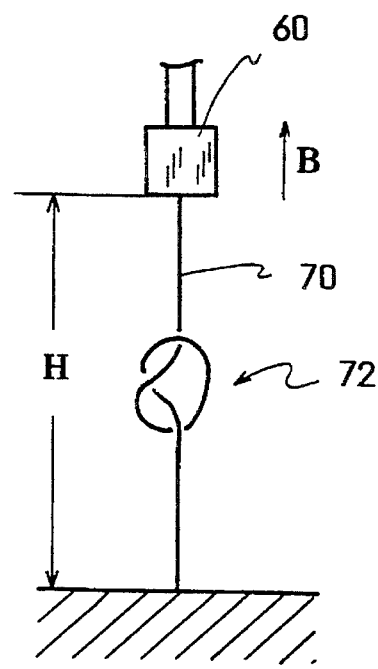
FIG. 5 is an explanation view showing how to measure the knot strength of the yarn.

The knot strength of the yarn is measured by a manner shown in FIG. 5. In FIG. 5, there is formed a knot section 72 midway of the yarn 70 to be measured. One end of the yarn 70 the other end of the yarn 70 is clamped by the clamper 60. Then the clamper 60 is pulled in the direction of the arrow B to measure the strength of the yarn 70.

Note that, the yarn 70, which is measured the knot strength, is formed by collecting the filaments with a sizing agent, e.g., epoxy resins.

In the yarn of the present embodiment, at least a part of the filaments have flat shapes in the transverse sections and twisted sections, which are serially formed in the axial direction with separations. By the flat shapes and the twisted sections of the filaments, the weaving and knitting performance including the loop strength and the knot strength can be improved.

Figure 1B:
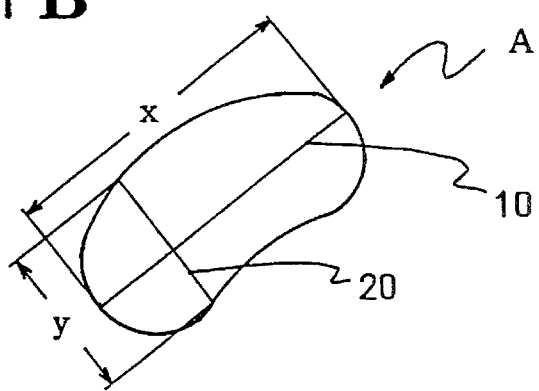
FIG. 1B is a transverse sectional view of a flat filament thereof.
Figure 1C:
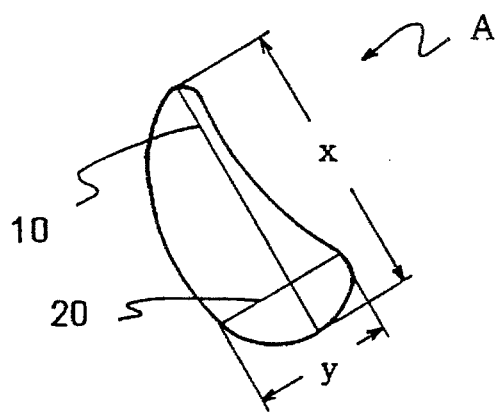
FIG. 1C is a transverse sectional view of a flat filament thereof.

As shown in FIGS. 1A–1C, each flat filament A has a first part 10, whose width (a first width) is maximum width of the flat section, and a second part 20, whose width (a second width) is maximum width in the direction perpendicular to the direction of the first part 10.

Sectional shape of the flat filaments A must have the first part 10 and the second part 20 shorter than the first part 10. But the sectional shapes thereof may be, for example, an ellipse (see FIG. 1A), an arc (see FIG. 1B) and an tear drop (see FIG. 1C).

Figure 2:
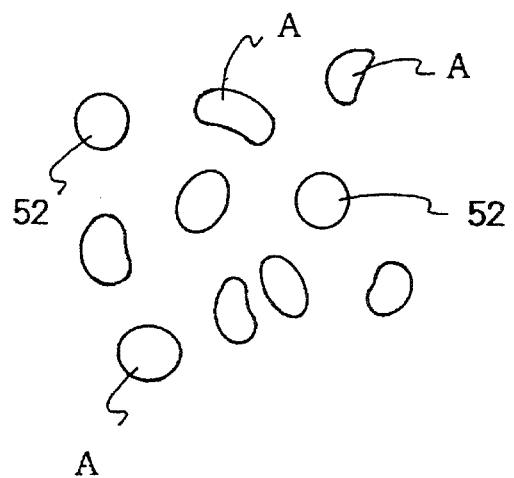
FIG. 2 is a partial sectional view of the yarn.

And, as shown in FIG. 2, the yarn may have the flat filaments A and filaments 52 having circular shapes in section.

In the yarn having the flat filaments A and the circular filaments 52 shown in FIG. 2, the properties of the yarn, e.g., the loop strength, the flexibility, are raised if the mixture rate of the flat filaments A. Therefore, the weaving and knitting performance of the yarn will be improved if the mixture rate of the flat filaments A is at or greater than 10%, especially at or greater than 30%.

In the flat filament A, if the ratio of the first width (x) to the second width (y) or the degree of flatness (x/y) of the yarn is greater, the flexibility of the yarn can be raised but the loop strength thereof is lowered. With this property, the yarn is capable of having enough strength and being improved the flexibility, etc. if the degree of flatness (x/y) is 1.1–3.0, more preferably 1.2–2.5.

Figure 3A:
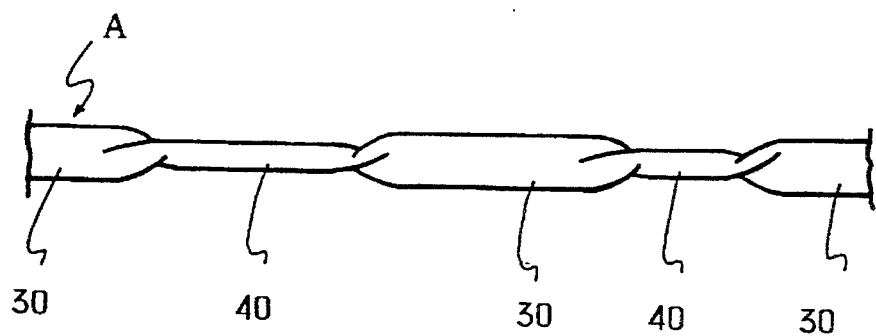
FIG. 3A is a partial front view showing a longitudinal shape of the flat filament of the yarn.
Figure 3B:
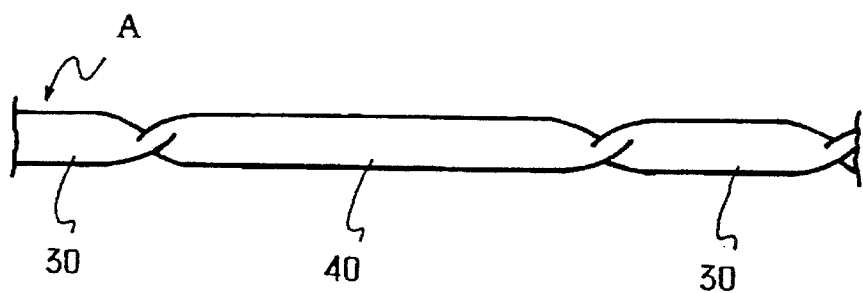
FIG. 3B is a partial front view showing a longitudinal shape of the flat filament of the yarn.

The flat filaments A shown in FIGS. 1A–1C and 2 has a plurality of twisted sections serially arranged in the axial direction of the filaments A with separations (see FIGS. 3A and 3B).

The filaments A shown in FIGS. 3A and 3B have twisted sections 40 and non-twisted sections 30, which are alternatively arranged. In FIG. 3A, the twisted sections 40 are twisted about 90° with respect to the non-twisted sections 30. In FIG. 3B the twisted sections 40 are twisted about 180° with respect to the non-twisted sections 30.

Each flat filament A may have the twisted sections 40 shown in FIG. 3A or ones shown in FIG. 3B or the both.

Note that, to maintain proper yarn strength, the separations between adjacent twisted sections 40 are preferably 10–500 μm.

Figure 7:
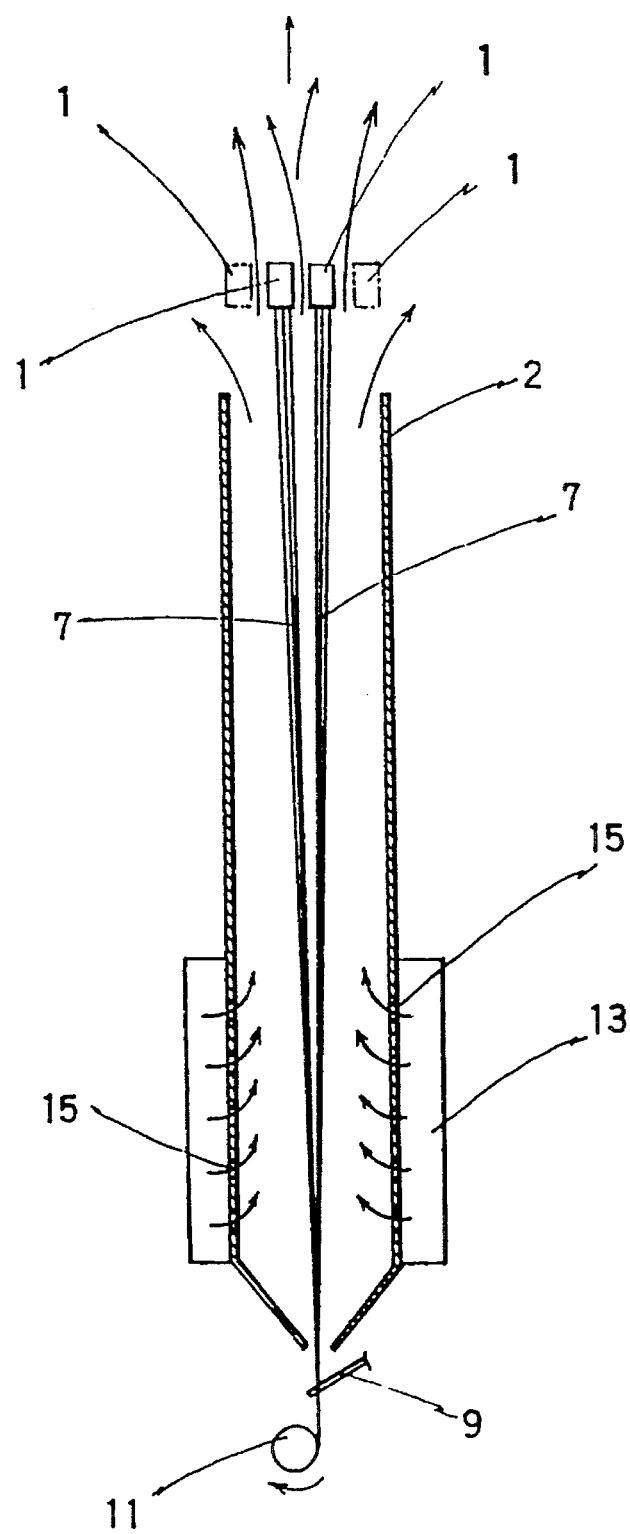
FIG. 7 is a summarized view of a spinning machine for making the yarn.

The yarn of the present embodiment can be made by spinning mother liquid, which is made by concentrating an aqueous solution including oxide precursor, which comprises the colloidal silica and the basic aluminum chloride, and polyvinyl alcohol, with a spinning machine shown in FIG. 7.

In FIG. 7, there are provided a plurality of spinning packs 1 in an upper section of a spinning chimney 2.

There are provided spinnerets, each of which has a plurality of extruding holes, on bottom faces of the spinning packs 1. To form filaments 7, the mother liquid is simultaneously extruded into the spinning chimney 2 through the extruding holes.

The filaments extruded are runs in the spinning chimney 2, and contact countercurrent of a hot dry fluid, e.g., hot dry air, so as to dry. The filaments dried are collected by a collecting pin 9 and wound by a winding unit 11.

Winding speed of the winding unit 11 is optionally defined according to the productivity the yarn but the preferable winding speed is at or less than 100 m/min. so as to properly dry the filaments 7.

Note that, the hot dry fluid is heated by a heating section 13, which is provided in a lower section of the spinning chimney 2, then introduced into the spinning chimney 2 via fluid holes 15, which are bored in the lower section of the spinning chimney 2.

Figure 8:
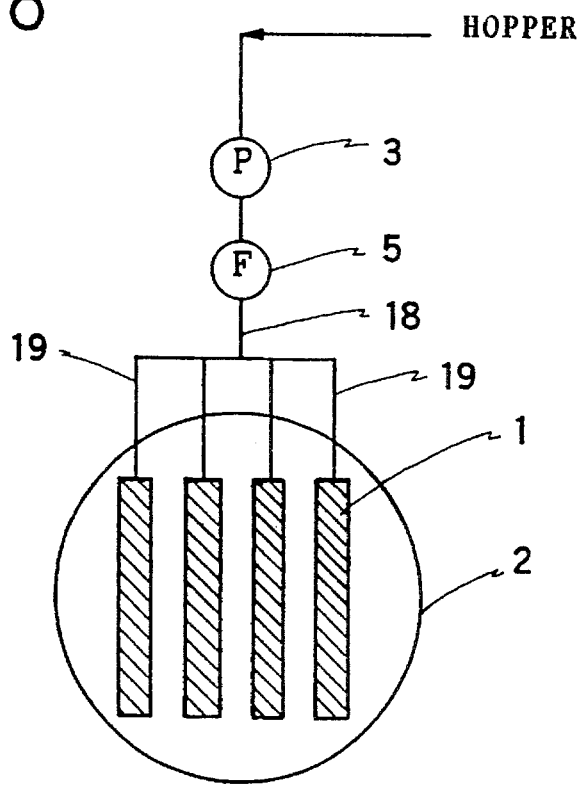
FIG. 8 is a an explanation view showing routes for, supplying mother liquid to spinning packs shown in FIG. 7.

As shown in FIG. 8, the mother liquid supplied to the spinning packs 1 is introduced thereto via a hopper, a pump 3 for sending fixed amount of the mother liquid, and a filter 5.

In a pipe 18 for sending the mother liquid and branched pipes 19 for supplying the mother liquid to each spinning pack 1, the pipe length between tile hopper and each spinning pack 1 is almost fixed, and/or the branch pipes 19 are extended from a chamber, which is provided at a front end of the pipe 18, to each spinning pack 1. With this structure, supplying pressure of the mother liquid in each spinning pack 1 can be same as much as possible, so that uniform filaments can be produced.

In the spinning machine shown in FIG. 7, since each spinning pack 1 having the spinnerets whose extruding holes are arranged in a horizontal plane with gaps, the filaments 7 are extruded as a plurality of filament groups, and a part of the hot dry fluid rising in the spinning chimney 2 is discharged therefrom via the gaps.

In the spinning machine, the filaments extruded are divided into a multiple smaller groups, and the hot dry fluid are run like wrapping the filaments. Thus, each filaments can be fully contacted the hot dry fluid.

Since the spinning machine shown in FIG. 7 has the separated spinnerets, 600 or more extruding holes can be provided thereto. With this structure, a yarn having 600 or more filaments can be made without collecting a plurality of yarns, so that a collecting step of yarns can be omitted.

Note that, yarns collected are apt to have yarn separations but the yarns made by the spinning machine shown in FIG. 7 are hard to have yarn separations.

Figure 9:
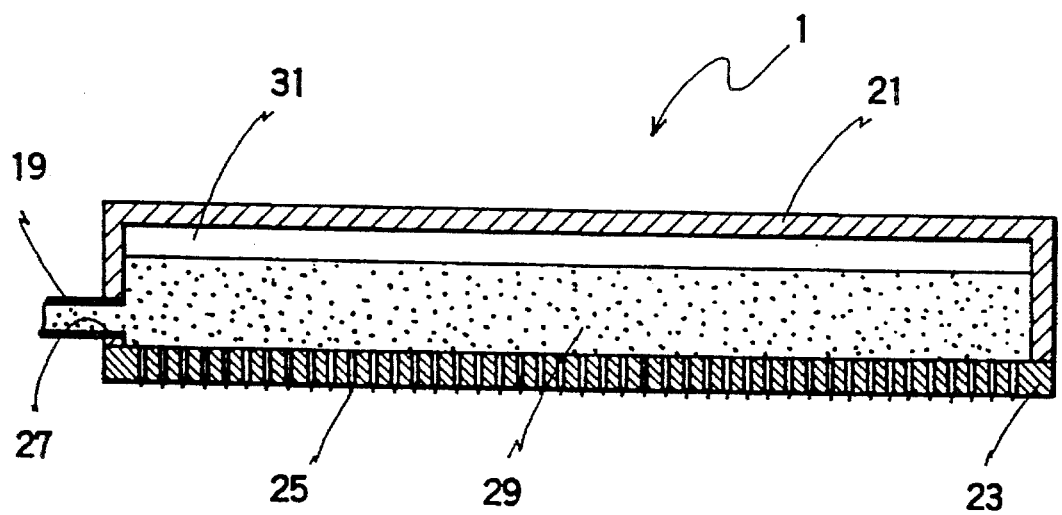
FIG. 9 is a longitudinal sectional view of the spinning pack shown in FIGS. 7 and 8.

The spinning pack 1, which is used in the machine of FIG. 7, is precisely shown in FIG. 9. FIG. 9 is a longitudinal sectional view of the spinning pack 1. There is provided a rectangle spinneret 23, which is made of a stainless steel plate, on a bottom face of a rectangle housing 21 of the spinning pack 1. There are bored a multiple extruding holes 25, which are arranged in a matrix form, in the spinneret 23.

As shown in FIG. 10A, the extruding holes 25 are connected to each liquid hole 33 and bored at each projected section 35, which is projected downward from a bottom face of the spinneret 23.

By the extruding holes 25, wetting the mother liquid in the vicinity of outer ends of the extruding holes 25 can be reduced, so that not only the mother liquid can be easily left from the extruding holes 25 but also stable spinning can be executed with smoothing a flow of the hot dry fluid by the projected sections 35.

There is provided a supplying port 27, to which the branch pipe 19 for introducing the mother liquid into the rectangle housing 21 and in the vicinity of an upper face of the spinneret 23, on a side face of the housing 21.

When the mother liquid is supplied into the housing 21 of the spinning pack 1 so as to form an air layer 31 above the mother liquid layer 29, the liquid layer 29 has uniform thickness with respect to the upper face of the spinneret 23, so that the mother liquid can be uniformly extruded from each extruding hole 25.

If the liquid holes 33 of the spinneret 23 have tapered shape in section as shown in FIG. 10B, the fluid stream therein can be more smooth.

In the spinning machine shown in FIG. 7, to make the yarns having greater loop strength, it is important to rapidly dry the filaments extruded from the extruding holes 25.

To rapidly dry the filaments extruded, it is necessary to make contact the filaments with the hot dry fluid and to supply the hot dry fluid whose dew point is lower than 4° C. into the spinning chimney 2 via the holes 15.

Said hot dry fluid (air) can be made by the steps of, for example, compressing and drying air, and adsorbing moisture by an adsorbent, e.g., zeolite, activated alumina, if necessary.

The ceramic fiber yarn of the present invention is made by firing the filaments under known conditions.

Note that, when the humidity of the fluid supplying into the spinning chimney 2 is lower and the temperature thereof is higher, the mixture rate of the flat filaments having the flat sectional shapes and the twisted sections is apt to be higher.

In the above described embodiment (FIGS. 7–10B), the bottom faces of the spinning packs 1, to which the separated spinnerets are attached, are arranged in the same horizontal plane with the gaps. One spinneret having a plurality of groups of the extruding holes (see FIGS. 11A and 11B) may be employed. In this case, gaps through which a part of the hot dry fluid can be introduced out from the spinning chimney 2 are formed in the spinneret.

In FIG. 11A, the extruding holes 25 are arranged like coaxial circles in a circular spinneret 23. And there are bored a plurality of the circular gaps 50 through which a part of the hot dry fluid is introduced out in a center part and an edge part of the spinneret 23.

In FIG. 11B, the extruding holes 25 are arranged in a matrix form in a rectangle spinneret 23. And a plurality of the linear gaps 50 like slits through which a part of the hot dry fluid is introduced out are bored in parallel.

Successively, details of the present embodiments will be explained with examples.

[EXAMPLE 1]

(1) MAKING THE CERAMIC FIBER YARN

The mother liquid is made by mixing 17.3 Kg of an aqueous solution of basic aluminum chloride including 13.2 wt % of aluminum ion and 12.6 wt % of chlorine; 8.4 kg of colloidal silica including 20 wt. % of $SiO_2$; 30 g of phosphoric acid; and 15 Kg of an aqueous solution including 10 wt % of polyvinyl alcohol. Then the mother liquid is concentrated to be 550 poise (20° C.) under a decompression state.

The mother liquid is spun by the spinning machine shown in FIG. 7. The machine has four spinning packs, and the spinning packs (see FIG. 9) have the spinnerets shown in FIG. 10A. Each spinneret has 250 extruding nozzles, each of which has diameter of 0.2 mm and hole length of 0.2 mm.

The filaments are extruded into the spinning chimney, in which the temperature is maintained at 80° C. in the vicinity of the spinnerets, via the extruding nozzles of the spinnerets. The filaments extruded are made contact with dry air, whose dew point is 2° C., introduced from the lower section of the spinning chimney. Then the filaments are collected and drawn at linear rate of 30 m/min., so that a precursor comprising 1,000 filaments is gained.

Next, the precursor fiber is fired for 30 minutes at the temperature of 1,200° C., so that a yarn comprising 1,000 transparent filaments, which include 72 wt % of alumina and 28 wt % of silica, is gained.

(2) PROPERTIES OF THE CERAMIC FIBER YARN

① sectional Shape of The Yarn, Etc.

By observing sectional shapes of the yarn with a microscope, about 80% of the filaments are the flat ones. An average of the first width (x) of the flat filaments is about 11 μm; an average of the second width (y) thereof is about 7 μm. Thus, an average degree of the flatness of the flat filament (x/y) is about 1.6.

Each flat filament has the twisted sections, which are twisted about 90° with respect to the non-twisted sections, with separations of 30–60 μm.

The strength of 20 flat filaments, which are randomly selected, is respectively measured. Their average tensile strength is 2.3 GPa; their average tensile modulus is 200 GPa.

② The Loop Strength of The Filament

The loop strength of 20 filaments, which are randomly selected from the yarn gained, is respectively measured by the manner shown in FIG. 4. Namely, measured by the wire having a circular sectional shape and the diameter of 0.5 mm. An average loop strength is $3.7 \times 10^{-2}$ N (N: Newton).

Note that, the length of the filament (from the gripper 64 to the hook of the wire 22) is 25 mm; and the draw rate is 5 mm/minutes.

③ The Knot Strength of The Yarn

The knot strength of 20 yarns, which are partly sampled from the gained yarn comprising 1,000 filaments, is respectively measured by the manner shown in FIG. 5. An average knot strength is 314 dyn/TEX.

Note that, the length of the yarn (from the clamper 60 to the fixed end of the yarn 70: indicated as the length "H" in FIG. 5) is 25 mm; one knotted section is formed about center the yarn measured; the draw rate is 20 mm/minutes; and the yarn is collected by bisphenol-A type epoxy resin, whose weight is 3 wt % of the yarn, as the sizing agent.

(3) KNITTING PERFORMANCE

The yarn gained is used for cylindrical emitting with a cylinder knitter. No yarn cutting and no yarn separation are occurred while knitting. A knitted product has a good outer shape and no fluff.

[EXAMPLE 2]

The yarn gained in EXAMPLE 1 is heated in the atmosphere for various time at the temperature of 1,400° C. Then the crystal structure and an average crystal size are analyzed by a manner of X-ray powder diffraction analysis. Furthermore, the loop strength of the yarn, etc. are also measured. The results are shown in TABLE 1.

Note that, in EXAMPLE 2, a comparative sample yarn is prepared. Mother liquid of the comparative yarn is made by mixing 13.34 Kg of an aqueous solution of basic aluminum chloride including 13.5 wt % of aluminum ion and 12.8 wt % of chlorine; 3 Kg of colloidal silica including 20 wt % of silica; and 12 Kg of an aqueous solution including 10 wt % of polyvinyl alcohol. Then the mother liquid is concentrated to be 750 poise (20° C.) under a decompression state. Other conditions are the same as that of EXAMPLE 1. The weight ratio of the alumina to the silica in the yarn fired (alumina/silica) is 85/15. The comparative yarns also heated in the atmosphere for various time at the temperature of 1,400° C. Then the crystal structure, an average crystal size and the loop strength, etc. are measured. The results are also shown in TABLE 1.

TABLE 1

| HEATING TIME (Hr) [1400° C.] | TRANSPARENCY | FLEXI- BILITY | STRENGTH (GPa) | CRYSTAL STRUCTURE | AVERAGE CRYSTAL SIZE (A) |
| --- | --- | --- | --- | --- | --- |
| THE YARN OF EXAMPLE 1 | | | | | |
| 0 | TRANSPARENT | ⊚ | 2.3 | γ | 50 |
| 0.1 | TRANSPARENT | ⊚ | 1.9 | M, γ | 340 |
| 0.5 | ALMOST TRANSPARENT | ○ | 1.7 | M | 670 |
| 2 | ALMOST TRANSPARENT | ○ | 1.6 | M | 710 |
| 30 | ALMOST TRANSPARENT | ○ | 0.6 | M | 860 |
| 100 | ALMOST TRANSPARENT | ○~Δ | UNABLE TO MEASURE | M | 990 |
| THE COMPARATIVE YARN | | | | | |
| 0 | TRANSPARENT | ⊚ | 2.6 | γ | 50 |
| 0.1 | TRANSPARENT | ⊚ | 2.0 | M, γ | 300 |
| 0.5 | ALMOST TRANSPARENT | ○ | 1.8 | M, γ | 390 |
| 2 | ALMOST TRANSPARENT | ○~Δ | 1.5 | M, α | 770 |
| 30 | OPAQUE | X | UNABLE TO MEASURE | M, α | LARGE CRYSTAL |
| 100 | OPAQUE | X | UNABLE TO MEASURE | M, α | LARGE CRYSTAL |

Note:
⊚ Having good flexibility
○ Having enough flexibility
Δ Having slight flexibility
X Having no flexibility
γ Polycrystalline transition alumina
α α-alumina
M polycrystalline mullite As clearly shown in TABLE 1, the crystal structure of the yarn of EXAMPLE 1 changes to about 100% of polycrystalline mullite after heating for 30 minutes at the temperature of 400° C.

On the other hand, the crystal structure of the comparative yarn, which is measured on the basis of peak intensity of X-ray powder diffraction, changes to about 54% of polycrystalline mullite after heating for 30 minutes at the temperature of 1,400° C.; about 46% of polycrystalline transition alumina is left. Therefore, the polycrystalline transition alumina left changes to α-alumina crystal after heating for two hours at the temperature of 1,400° C. When the yarn is further heated, the average crystal size suddenly becomes greater, so that the tensile strength and the flexibility become worse.

In the yarn of EXAMPLE 1, an average growing rate of the average crystal size with respect to the heating at the temperature of 1,400° C. is less than that of the comparative yarn. Even if the yarn is heated for 30 hours, the yarn has enough flexibility and the strength of 0.6 GPa.

[EXAMPLE 3]

A yarn is spun in the spinning chimney whose inner temperature in the vicinity of the spinnerets is maintained at 60° C., and the dew point of the hot dry air introduced therein is 4° C. Other conditions are the same as that of EXAMPLE 1.

Transverse sectional shapes of the yarn are substantially circle, and substantially no twisted sections are formed in the filaments.

The average tensile strength of the yarn is 2.0 GPa; the average tensile modulus thereof is 180 GPa.

The loop strength of the filament of the yarn is $2.7 \times 10^{-2}$ N; the knot strength thereof is 238 dyn/TEX.

No yarn cutting and no yarn separation are occurred while knitting by the cylinder kniter. A knitted product has a good outer shape and no fluff.

Note that, the yarn has crystal structure mainly comprising polycrystalline transition alumina, and it changes to polycrystalline mullite after heating for 30 minutes at the temperature of 1,400° C.

[COMPARATIVE EXAMPLE]

A yarn is spun in the spinning chimney whose inner temperature in the vicinity of the spinnerets is maintained at 60° C., and the dew point of the hot dry air introduced therein is 9° C. Other conditions are the same as that of EXAMPLE 1.

Transverse sectional shapes of the yarn are substantially circle, and substantially no twisted sections are formed in the filaments.

The average tensile strength of the yarn is 1.8 GPa; the average tensile modulus thereof is 180 GPa.

The yarn has crystal structure mainly comprising polycrystalline transition alumina, and it changes to polycrystalline mullite after heating for 30 minutes at the temperature of 1,400° C.

The loop strength of the filament of the yarn is $1.8 \times 10^{-2}$ N (namely less than $2.5 \times 10^{-2}$ N); the knot strength thereof is 178 dyn/TEX.

When the cylinder knitting is executed with the yarn of COMPARATIVE, EXAMPLE, yarn cutting is frequently occurred, so that knitting is stopped.

In the present invention, the ceramic fiber yarns having a superior heat-resisting property can be made by spinning the mother liquid, which includes basic aluminum chloride having high extensibility, so that the productivity of the yarn can raised.

Furthermore, the ceramic fiber yarns of the present invention has higher weaving and knitting performance, and heat-resisting cloth having a good outer shape can be made by employing the yarn.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A ceramic fiber yarn comprising a group of filaments, said filaments being made by the steps of spinning a mother liquid, which comprises colloidal silica and basic aluminum chloride, and firing, said filaments comprising 67–75 wt % of alumina and 25–33 wt % of silica and mainly having polycrystalline transition alumina, wherein the loop strength of each said filament, which is measured by a wire having diameter of 0.5 mm, is at least $2.5 \times 10^{-2}$ N;

the crystal structure of said filament substantially changes to polycrystalline mullite after heating for 30 minutes at a temperature of 1,400° C.; and wherein a part of said filaments of said group have flat shapes in the transverse sections and twisted sections, which are serially formed, with separations, in the axial direction of said filaments.

2. The ceramic fiber yarn according to claim 1, wherein the knot strength of said yarn is at least 200 dyn/TEX.

3. The ceramic fiber yarn according to claim 1, wherein at least 10% of the filaments of said group are said filaments having flat shapes.

4. The ceramic fiber yarn according to claim 1, wherein the ratio of a first width, which is the maximum width of the flat section of said filament, to a second width, which is the maximum width thereof in the direction perpendicular to the direction of the first width, is 1.1–3.0.

5. The ceramic fiber yarn according to claim 1, wherein the separations between said twisted sections are 10–500 μm.

\* \* \* \* \*